(12) United States Patent
Meador et al.

(10) Patent No.: US 8,067,478 B1
(45) Date of Patent: Nov. 29, 2011

(54) PROCESS FOR PREPARING POLYMER REINFORCED SILICA AEROGELS

(75) Inventors: Mary Ann B. Meador, Strongsville, OH (US); Lynn A. Capadona, North Ridgeville, OH (US)

(73) Assignee: The United States of America as represented by the Administrator of National Aeronautics and Space Administration, Washington, DC (US)

( * ) Notice: Subject to any disclaimer, the term of this patent is extended or adjusted under 35 U.S.C. 154(b) by 746 days.

(21) Appl. No.: 11/582,693

(22) Filed: Oct. 19, 2006

(51) Int. Cl.
| | |
|---|---|
| C08G 77/00 | (2006.01) |
| C08G 18/48 | (2006.01) |
| C08G 77/38 | (2006.01) |
| C08J 9/00 | (2006.01) |
| C08F 283/00 | (2006.01) |
| C08F 283/12 | (2006.01) |

(52) U.S. Cl. .......................... 521/154; 521/99; 525/474
(58) Field of Classification Search ................. 521/99, 521/154
See application file for complete search history.

(56) References Cited

U.S. PATENT DOCUMENTS

| | | | | |
|---|---|---|---|---|
| 4,166,078 A | * | 8/1979 | Getson | 528/26 |
| 4,522,985 A | * | 6/1985 | Ryang | 525/431 |
| 5,656,195 A | * | 8/1997 | Mielke et al. | 252/62 |
| 5,767,167 A | * | 6/1998 | Ferry | 521/64 |
| 5,911,658 A | * | 6/1999 | Yoldas | 516/101 |
| 5,973,015 A | * | 10/1999 | Coronado et al. | 521/64 |
| 6,271,273 B1 | * | 8/2001 | You et al. | 521/61 |
| 2004/0063803 A1 | * | 4/2004 | Kim et al. | 522/1 |
| 2004/0132845 A1 | * | 7/2004 | Rhine et al. | 521/82 |
| 2004/0132846 A1 | * | 7/2004 | Leventis et al. | 521/99 |
| 2005/0131163 A1 | * | 6/2005 | Rhine et al. | 525/420 |
| 2005/0192366 A1 | * | 9/2005 | Ou et al. | 521/64 |
| 2005/0192367 A1 | * | 9/2005 | Ou et al. | 521/64 |
| 2006/0084707 A1 | * | 4/2006 | Ou et al. | 516/78 |
| 2006/0154044 A1 | * | 7/2006 | Yamada et al. | 428/312.2 |
| 2006/0246806 A1 | * | 11/2006 | Rhine et al. | 442/417 |
| 2006/0263587 A1 | * | 11/2006 | Ou et al. | 428/292.1 |
| 2006/0281825 A1 | * | 12/2006 | Lee et al. | 521/50 |
| 2006/0286360 A1 | * | 12/2006 | Rhine et al. | 428/221 |
| 2007/0014979 A1 | * | 1/2007 | Bullock et al. | 428/292.1 |
| 2007/0037903 A1 | * | 2/2007 | Swift | 523/218 |
| 2007/0112090 A1 | * | 5/2007 | Kashiwagi | 522/172 |

OTHER PUBLICATIONS

Zhang et al. (Journal of Non-Crystalline Solids 350, 2004, 152-164).*
Katti et al. Chem Mater. 2006 18, 285-296 (Available online Dec. 16, 2005).*
Yim et al. Korean J. Chem. Eng. 19(1)159-166 2002.

* cited by examiner

Primary Examiner — Mark Eashoo
Assistant Examiner — Liam Heincer
(74) Attorney, Agent, or Firm — James V. Tura, Esq.; Robert H. Earp, III

(57) ABSTRACT

Process for preparing polymer-reinforced silica aerogels which comprises a one-pot reaction of at least one alkoxy silane in the presence of effective amounts of a polymer precursor to obtain a silica reaction product, the reaction product is gelled and subsequently subjected to conditions that promotes polymerization of the precursor and then supercritically dried to obtain the polymer-reinforced monolithic silica aerogels.

9 Claims, No Drawings

PROCESS FOR PREPARING POLYMER REINFORCED SILICA AEROGELS

ORIGIN OF INVENTION

The invention described herein was made by employees of the United States Government and may be manufactured and used by or for the Government for governmental purposes without the payment of any royalties thereon or therefor.

FIELD OF THE INVENTION

This invention relates to a one-pot reaction for preparing polymer-reinforced metal oxide aerogels and more specifically to a process for preparing polymer-reinforced silica aerogels derived from the reaction of at least one type of an alkoxysilane in the presence of an effective amount of a polymer precursor to obtain a silica reaction product which is formed into a gel, followed by subjecting said gel to polymerization and subsequently drying said polymererized gel to obtain polymer-reinforced, crosslinked aerogel monoliths.

This process introduces the polymer precursor into the oxide sol before gellation either as an agent which co-reacts with the oxide gel or as a soluble polymer precursor which does not interact with the oxide gel in any way or both. Subsequent exposure of the gel to heat, light, catalyst or any other method of promoting polymerization causes polymer crosslinking without the need for any additional infiltration steps thereby significantly shortening the process. Another advantage is that the resulting aerogel monolith is more uniform, since the addition of a polymer crosslinker is not limited by diffusion. Moreover, where complete polymerization requires a balanced stoichiometry, this requirement is more easily met by this one-pot process. The primary requirement of the one-pot reaction process is that the polymer crosslinking agent does not interfere with gellation of the silica. This means that the precursor molecules are present in the sol, but are substantially inert until conditions are met for polymerization or they partially react with the forming gel at low enough concentration to allow gellation to take place. For example, polyamic acid oligomers capped with aminopropyltrimethoxysilane (APTES) combined in solvent with tetramethoxysilane, water and amine catalyst gels in less than an hour. Subsequently, heating the gels at temperatures ranging up to about 200° C. causes imidization to talke place. Supercritical drying of the gel yields a strong, polyimide crosslinked aerogel monolith. In another example, trimethoxysilypropyl acrylate coreacts with tetramethoxy silane (TMOS) and water, either in the presence of additional acrylate molecules in the sol or by itself. The gel is then exposed to heat in the presence of an initiator or U.V. light, which causes acrylate polymerization. Supercritical drying of the gel produces a strong acrylate-crosslinked aerogel monolith. A flexible polymer crosslinked aerogel can be produced in the same way by introducing flexible linking groups as alternate flexible polymer precursors in the sol and keeping the silane concentration relatively low.

The unique feature of this invention is that instead of a process wherein the polymer precursor is infiltrated into an already formed metal oxide gel i.e. silica gel by soaking, this invention introduces the polymer precursor into the silica sol before gellation either as an agent which co-reacts with the oxide gel or as a soluble polymer precursor which does not interact with the forming oxide gel in any way or both. This process eliminates multiple washing and soaking steps thereby significantly shortening the process. Essentially, the production of a polymer crosslinked aerogel is produced in a one-pot synthesis. In addition, the resulting aerogel monolith of this invention is more uniform, since the addition of a polymer crosslinker is not limited by diffusion. Moreover, where complete polymerization requires a balanced stoichiometry (such as in polyimides or other step growth polymers), this requirement is met more easily because diffusion is not a factor.

BACKGROUND OF THE INVENTION

Ceramic aerogels are among the most highly porous and lowest density materials. Their high porosity means that 95% or greater of the total bulk volume of a ceramic aerogel is occupied by empty space, or air, producing excellent thermal as well as sound insulating qualities. In addition, their high specific surface area (e.g. on the order of 600~1000 $m^2/g$) make the aerogels well suited for numerous applications. Unfortunately, however, conventional ceramic aerogels are physically and hydrolytically very unstable and brittle. Their macro-structure can be completely destroyed by very minor mechanical loads e.g. vibrations or by exposure to moisture. Consequently, there has been little interest in ceramic aerogels for the above-mentioned reasons, despite their excellent properties, simply because aerogels are not strong enough to withstand even minor or incidental mechanical stresses likely to be experienced in practical applications. Therefore, these aerogels have been used almost exclusively in applications where they experience substantially no mechanical loading. However, crosslinking silica and other metal oxide aerogels with a polymeric material has proven to be an effective process to increase the strength of these aerogels without adversely effecting their porosity and low density. Most of these processes are very long and involved, requiring multiple washing and soaking steps to infiltrate the oxide gel with the polymer precursor after gelation. In addition, infiltration is limited by diffusion, sometimes resulting in aerogel monoliths which are not uniformly crosslinked.

Thus, by crosslinking a polymer into the bulk structure of the oxide gel, followed by supercritical drying, the resulting aerogel is reinforced while the mesoporous space between the particles is maintained. In the prior processes, in order to provide reinforced aerogels, the polymer crosslinker is reacted with the surface of the silica gel, because the silica particles are surface-terminated with reactive groups. Therefore, crosslinked aerogels are being prepared by polymerizing the prepolymer with the mesoporous surfaces of the silica gels in a two-step process; see Capadona et al. Polymer 47 (2006) 5754-5761; www.sciencedirect.com; Leventis et al. Journal of Non-Crystalline Solids 350 (2004) 152-164; Meador et al. Chemistry of Materials Vol 17, *No.* 5, 1085-1098.

SUMMARY OF THE INVENTION

This invention is directed to a one-pot process of crosslinking silica aerogels with a polymer as an effective method to increase the strength of the aerogels without adversely effecting the porosity and low density of the aerogel. More specifically, the one-pot process of this invention introduces the polymer precursor into the sol before gelation of the silica either as an agent which co-reacts with the silica or as a soluble polymer precursor which does not interact with the silica. Subsequent exposure of the silica reaction product to heat, light, catalyst or other method of promoting polymerization of the prepolymer causes polymer crosslinking without the need for additional processing steps.

Accordingly, it is an object of this invention to provide a process for preparing polymer-reinforced crosslinked aerogels.

It is another object of this invention to provide a one-pot reaction process for preparing polymer-reinforced silica aerogels.

It is another object of this invention to provide a process for preparing polymer-reinforced silica aerogels by reacting in one-pot at least one alkoxy silane in the presence of a polymer precursor followed by polymerization and supercritical drying.

DESCRIPTION OF THE PREFERRED EMBODIMENT

This invention relates to a process for preparing polymer-reinforced crosslinked metal oxide aerogels i.e. silica aerogels which comprises a one-pot reaction of at least one alkoxy silane in the presence of an effective amount of a polymer precursor, in solution, to obtain a silica reaction product. This silica reaction product is then gelled and subsequently subjected to polymerization by the use of heat, U.V. light, catalyst or any other method that promotes polymerization causing the prepolymer to polymerize and crosslink with the nano-structured framework of the silica gel. The silica gel reaction product is supercritically dried forming the polymer-reinforced crosslinked monolithic silica aerogel. The prepolymers or polymer precursors are selected from the group consisting of polyacrylate precursors, polyimide precursors, and di- or tri-isocyanates i.e. polyurea precursors. The temperatures in the one-pot reaction process generally range from about 70° C. up to 200° C. depending on which of the polymer precursors and alkoxy silanes are being reacted in the presence of the precursor. The effective amount of each of the reactants depends on the specific alkoxy silane and polymer precursor in the initial reaction, and can range from up to stoichiometric to an excess amount of the polymer precursor e.g. sufficient amount to reinforce the aerogel.

The following examples illustrate the preparation of polymer-reinforced silica aerogels using the one-pot process of this invention.

Example 1

One-Pot Synthesis for a Methacrylate Crosslinked Silica Aerogel

A mixture of 2.89 ml tetramethoxysilane and 0.96 ml (3-trimethoxysilyl) propyl methacryalte (Sigma-Aldrich) and 2.95 ml trimethylolpropane ethoxylate triacrylate and 4.5 ml of tetrahydrofuran or methanol as the solvent was prepared in a glass vial. A second mixture consisting of 4.5 ml of the same solvent, 1.5 ml water, and 86 mg 2-2' azo-bis-isobutyrylnitrile(AIBN) formulated to 2% wt. of the acrylate-containing components was prepared. The two mixtures were combined in a polypropylene mold until gel point was reached (~5 minutes for methanol mixtures, ~3 hours for THF mixtures) and allowed to age for one hour.

After aging for an hour, the samples were extracted into a bath containing enough gelation solvent to cover the gels and AIBN in the same concentration as above. The samples were placed in a 70 degree C. oven, or can be illuminated under UV light to initiate the crosslinking reaction. After crosslinking, the samples were washed to remove any residual water and supercritically dried. Resulting monoliths were analyzed by NMR which showed the products of crosslinking through the acrylates and incorporation of oligomeric triacrylate.

Example 2

One-Pot Synthesis of a Polyimide Crosslinked Silica Aerogel

In 15 ml of NMP, 1 g of 3,3',4,4'-benzophenonetetracarboxylic dianhhydride (BTDA) 2.31 g Jeffamine XTJ2000 (Huntsman) and 0.47 g 3-aminopropyl-triethoxysilane are stirred until dissolved. Slowly, 0.23 g 1,2,5-triaminophenyl-benzene (TAB) dissolved in 5 ml NMP is added with stirring. To the resulting auric acid solution is added 4.5 ml of tetramethoxysilane and the volume of the solution is increased to 30 ml. This solution is combined with a solution of 7 ml water in 23 ml NMP and 50 ml of $NH_4OH$ and shaken vigorously. The solution is poured into molds. Gelation occurs within 1 hour. The samples were extracted into a bath of NMP and heated to 100° C. for 10 hours to remove alcoholic byproducts of gelation. Then the temperature is raised to 185° C. to affect crosslinking. The samples were then washed and supercritically dried.

Example 3

One-Pot Synthesis of a Polyurea Crosslinked Silica Aerogel

To a solution of Huntsman diamine XTJ-502 (0.4788 g, 0.2 mmole), 3-aminopropyltriethoxysilane (0.975 ml, 0.922 g, 4.16 mmole), tetramethoxysilane (2.90 ml, 2.99 g, 19.67 mmole) in 9 ml acetonitrile cooled in dry ice-acetone bath is added a solution of (Bayer Desmodur N3200) di-isocyanate oligomer (2 g) in 5 ml acetonitrile with vigorous stirring. Water (3.5 ml) and 30% $NH_4OH$ (40 ul) in 5 ml acetonitrile is added to solution with vigorous stirring, and immediately poured into molds. Gelation occurs under 30 minutes, and allowed to age for 24 hours. The gels are extracted into enough acetonitrile to cover the gel and allowed to rest for about 12 hours. The gels in solvent are cured for about 8 hours at 70° C. after which solvent is exchanged once more, allowed to rest for about 12 hours and supercritically dried. The resulting aerogel monoliths are analyzed by NMR showing polyurea and carbamate carbonyl peaks and methylenes from APTES and N3200.

Since crosslinking is mostly polyurea-based, and given that the reaction of isocyanates with amines is generally faster than their reaction with hydroxyls and the resulting polyureas are generally stronger polymers than polyurethanes, control of polyurea formation throughout the crosslinking process can produce more robust aerogels. That requires surface modification of the skeletal silica nanoparticles with amines. That can be achieved by reaction of tetramethoxysilane (TMOS) and 3-aminopropyltriethoxylsilane (APTES). Although there is a large selection of isocyanates for use in preparing the polyurea-reinforced aerogels, the preferred isocyanates are available from The Bayer Corporation as Desmodure N3200, desmodur N3300A and Desmodur W. Desmodur N3200 is a mixture of isocyanates based on 1,6-hexamethylene diisocyanate. Desmodur N3300A is a rather pure triisocyanate based on 1,6-hexamethylene diisocyanate and Desmodur W. is a hydrogenated form of methylene dianiline di-isocyanate.

Example 4

One-Pot Synthesis of a Bis-Maleimide (BMI) Crosslinked Silica Aerogel

In 50 ml of NMP is dissolved 2.4 g (5.3 mmoles) of BMI (prepared from 1 eq of Bis(aminophenyl)xylene and 2 eq. maleic anhydride). To this solution is added 2.5 ml 3-aminopropyl-triethoxysilane (APTES) and 7.5 ml of tetramethoxysilane. A second solution of 7.75 ml $H_2O$ in NMP is also prepared and both solutions are cooled in a dry ice acetone bath for fifteen minutes. The cooled solutions are combined and shaken vigorously for 5 minutes and poured into molds. Gelation occurred within 15 hours. The gels were extracted from the molds into an NMP bath to wash out alcoholic by-products of the condensation and excess water. The wash solvent turned slightly yellow indicating that some BMI escaped from the gels. After 5 hours, the gels were transferred to clean solvent and heated to 150° C. for 4 hours. The cooled gels were then transferred to clean acetonitrile again. After 24 more hours, the samples were subjected to super critical fluid extraction. The dried gels had an average density of 0.1 $g/cm^3$. Solid NMR showed peaks for BMI reacted with the amino group.

In preparing the polyimide-reinforced silica aerogels, the polyimide precursors e.g. anhydride terminated polyamic acids are well known and include polyimide precursors derived from aromatic dianhydrides, aromatic diamines and reactive crosslinkable monofunctional endcaps. More specifically, the polyimide precursors includes mixtures of lower alkyl di- and/or mono-esters of aromatic dianhydrides, aromatic diamines, and monofunctional endcaps. The endcaps include monofunctional amines, monofunctional anhydrides, and the alkyl monester-acids or alkyl diesters of monofunctional anhydrides.

Some of the preferred dianhydrides include pyromeliticdianhydride (PMDA); 3,3',4,4'-benzophenone tetracarboxylic dianhydride (s-BTDA); 4,4'-(hexafluoroisopropylidene)-bis (phthalic anhydride) (HFDA); 3,3',4,4' biphenyltetracarboxylic dianhydride (BPDA); 2,3,3',4'-benzophenone tetracarboxylicdianhydride (a-BPDA); 4,4'-oxydiphthalic anhydride; 3,3'-oxydiphthalic anhydride; 5'-(1-methylethylidene)bis(1,4-phenyleneoxy)bis-1,3-isobenzofurandione (bisphenol A dianhydride). Various polyfunctional aromatic amines, including diamines, triamines and tetraamines and mixtures thereof can be used to prepare the polyimide precursors. These polyfunctional amines include diamines, e.g. aromatic diamines containing at least one benzene ring and preferably two benzene rings such as phenylenediamine, 4,4' diaminodiphenylpropane, 4,4'-diamino-diphenylmethanol, 4,4' benzidine, 3,3'-diamino-diphenyl sulfine, 1,5-diaminonaphthaliene, bisaniline-m-xylidene (BX), 3,3'-diaminobenzophenone, 3,4'-diaminodiphenylether, 2,2'-dimethylbenzidine, 3,3'-dimethylbenzidine and triamines such as 1,3,5-triaminobenzene, 2,4,6-triamino-s-triazine, 4,4',4'-triaminotriphenylmethane, and 4,4',4'-triaminotriphenylcarbinol. The preferred crosslinkable endcaps include, for example, 4-phenylethynylphthalic anhydride; 4-phenylethynylaniline; p-aminostyrene; endo-cis-bicyclo[2.2.1]-5-heptane-2,3-dicarboxylic anhydride (Nadic anhydride); 3 or 4-aminophenylacetylene and various other known amine and monoanhydrides.

Examples for preparing the polymer-reinforced metal oxide aerogels of this invention include the di-, tri-, and tetra-functional alkoxides such as the alkoxides of silicon having two, three and four Si—O bonds, respectively. The silanes can comprise a combination of silanes with tetra-, tri-, and dioxygen functionality having the general formula $R^2Si(OR^1)_4$ and $R^3R—Si(OR^1)_2$ where R, $R^1$, $R^2$ and $R^3$ are the same or different and represent hydrocarbon radicals. The R, $R^1$, $R^2$ and $R^3$ groups of the above formula are preferably lower alkyl groups, e.g. 1 to 8 carbons such as methyl, ethyl, propyl, isopropyl, butyl, isobutyl, pentyl, heptyl, hexyl, and include the alkenyl or vinyl unsaturated groups such as vinyl, divinyl, propenes, butenes and various mixtures thereof.

Other specific examples of silanes include the alkyltrialkoxy silanes such as methyltrimethoxysilane, ethyltrimethoxysilane, vinlytrimethoxysilane, amino-propyltriethoxy silane, 3-trimethoxysilylpropylmethacrylate and methyltriethoxysilane. The tetraalkoxy silanes include tetramethoxysilane, tetraethoxysilane, tetrapropoxysilane. The alkyldialkoxy silanes include diethyldiethoxysilane, diethydibutoxysilane, dimethyldiethoxysilane, methyldiethoxysilane, dimethyldimethoxysilane, diphenyldimethoxysilane, vinylmethyldiethoxysilane, divinyldiethoxysilane, and various combinations thereof in various ratios.

The polymer crosslinked aerogels prepared by the process of this invention with their high porosity combined with higher strength have excellent thermal as well as sound insulating qualities. In addition, their high specific surface areas (e.g. on the order of 600-1000 $m^2/g$) make these aerogels suited for numerous applications, including as adsorbent beds for chemical separations, catalyst supports, platforms for solid state sensors and the like.

While this invention has been described with preferred embodiments, it should be understood that various modifications and variations will be apparent to one skilled in the art and that such modifications and variations come within the scope of the appended claims.

The invention claimed is:

1. A one-pot process for preparing polymer-reinforced monolithic silica aerogels which comprises reacting at least one alkoxysilane and effective amounts of a polymer precursor to obtain a precursor-silica sol in solution, subsequently forming a precursor-silica gel from said precursor-silica sol, subjecting said precursor-silica gel to reaction conditions that initiate polymerization of said polymer precursor, subsequently drying said polymerized precursor-silica gel to obtain a polymer-reinforced crosslinked monolithic silica aerogel; said polymer precursor derived from the reaction of bis(aminophenyl)xylene and maleic anhydride.

2. The process of claim 1 wherein the polymerization is initiated by reaction conditions selected from the group consisting of heat, U.V. light, catalyst and combinations thereof.

3. The process of claim 1 wherein the temperature of the one-pot reaction ranges from about 70° C. to above 200° C.

4. The process of claim 1 wherein the precursor-silica sol is derived from a solution of at least one alkoxysilane and stoichiometric amounts of the polymer precursor.

5. A single-step one-pot process for preparing polymer-reinforced monolithic silica aerogels which comprises reactingtetramethoxy silanes or triethoxy silanes and effective amounts of a polymer precursor to obtain a precursor-silica sol in solution, subsequently forming a precursor-silica gel from said precursor-silica sol, subjecting said precursor-silica gel to reaction conditions that initiate polymerization of said polymer precursor, subsequently drying said polymerized precursor-silica gel to obtain polymer-reinforced cross-linked monolithic silica aerogels; said polymer precursor derived from the reaction of 3,3',4,4'-benzophenonetetracarboxylic dianhydride and polyfunctional amines.

6. The process of claim 5 wherein one alkoysilane is a triethoxysilane.

7. The process of claim 5 wherein the polymerization is initiated by reaction conditions selected from the group consisting of heat, U.V. light, catalyst and combinations thereof.

8. The process of claim 5 wherein the temperature of the one-pot reaction ranges from about 70° C. to above 200° C.

9. The process of claim 5 wherein the precursor-silica sol is derived from a solution of at least one alkoxysilane and stoichiometric amounts of the polymer precursor.

* * * * *